(12) United States Patent
Good et al.

(10) Patent No.: US 8,078,193 B2
(45) Date of Patent: Dec. 13, 2011

(54) METHOD AND SYSTEM FOR DETERMINING RADIO SPECTRUM AVAILABILITY AND QUALITY

(75) Inventors: Richard Scott Good, South Riding, VA (US); Michael Lasky, Arlington, VA (US); Timothy Dunne, Falls Church, VA (US); Fassil Abebe, Woodbridge, VA (US); Daniel Krause, Fenton, MI (US)

(73) Assignee: XO Communications, Inc., Herndon, VA (US)

( * ) Notice: Subject to any disclaimer, the term of this patent is extended or adjusted under 35 U.S.C. 154(b) by 415 days.

(21) Appl. No.: 12/385,666

(22) Filed: Apr. 15, 2009

(65) Prior Publication Data

US 2009/0275289 A1 Nov. 5, 2009

Related U.S. Application Data

(60) Provisional application No. 61/071,282, filed on Apr. 21, 2008.

(51) Int. Cl.
*H04W 24/00* (2009.01)
(52) U.S. Cl. ............. 455/456.1; 455/456.2; 455/456.3
(58) Field of Classification Search ......... 455/456.1
See application file for complete search history.

(56) References Cited

U.S. PATENT DOCUMENTS

| 6,445,912 | B1 | 9/2002 | Cole et al. | |
|---|---|---|---|---|
| 6,957,073 | B2 * | 10/2005 | Bye | 455/456.1 |
| 7,277,710 | B1 * | 10/2007 | Jones et al. | 455/456.1 |
| 7,853,267 | B2 * | 12/2010 | Jensen | 455/456.1 |

* cited by examiner

*Primary Examiner* — Hai L Nguyen
(74) *Attorney, Agent, or Firm* — Finnegan, Henderson, Farabow, Garrett & Dunner, L.L.P.

(57) ABSTRACT

A method is provided for analyzing radio spectrum solutions of a wireless communication service. The method may include obtaining address information of two end points of a wireless communication path of the wireless communication service and performing a check on the address information based on a database system configured to store valid address information and associated geographical information. The method may also include obtaining location related information including a distance between the two end points and determining rain zone information based on the address information and associated geographical information, retrieving radio equipment information on a plurality of radio equipment, and determining a plurality of available wireless communication solutions based on the location related information and the radio equipment information. Each solution may include at least one of a radio spectrum availability and a throughput. Further, the method may include presenting the plurality of wireless communication solutions.

21 Claims, 12 Drawing Sheets

LMDS Prequalification | LMDSXchange | Nextlink | Contact Us | FAQ

ENTER ADDRESSES FOR POINT A AND POINT B
OR ENTER THE LATITUDE / LONGITUDE IN DECIMAL DEGREES

Address A
STREET
CITY            STATE
ZIP CODE
OR
LATITUDE            LONGITUDE

Address B
STREET
CITY            STATE
ZIP CODE
OR
LATITUDE            LONGITUDE Find Addresses © Copyright 2008. Nextlink Wireless, Inc. All rights reserved.      Disclaimer | Terms of Service

FIG. 8

LMDS Prequalification

LMDSXchange | Nextlink | Contact Us | FAQ

ENTER ADDRESSES FOR POINT A AND POINT B
OR ENTER THE LATITUDE / LONGITUDE IN DECIMAL DEGREES

Address A
- STREET: 13865 sunraise valley drive
- CITY: herndon   STATE: va
- ZIP CODE: 20171

OR

LATITUDE [ ]   LONGITUDE [ ]

Address B
- STREET: [ ]
- CITY: [ ]   STATE: [ ]
- ZIP CODE: [ ]

OR

LATITUDE: 38.945955   LONGITUDE: -77.330779

[Find Addresses]

© Copyright 2008. Nextlink Wireless, Inc. All rights reserved.   Disclaimer | Terms of Service

FIG. 9

LMDS Prequalification

LMDSXchange | Nextlink | Contact Us | FAQ

ENTER ADDRESSES FOR POINT A AND POINT B
OR ENTER THE LATITUDE / LONGITUDE IN DECIMAL DEGREES

Address A
- STREET: 13865 Sunrise Valley Dr
- CITY: Herndon   STATE: VA
- ZIP CODE: 20171-6187

OR

- LATITUDE: 38.9522306   LONGITUDE: -77.4261470

Address B
- STREET:
- CITY:   STATE:
- ZIP CODE:   County:   Rain Zone: 0

OR

- LATITUDE: 38.945955   LONGITUDE: -77.330779

Addresses found and normalized.
Service may not available for address B

Service is available in your area. Please confirm that the addresses above are accurate, and hit the Submit button below to review your service options.

[Submit]

© Copyright 2008. Nextlink Wireless, Inc. All rights reserved.   Disclaimer | Terms of Service

FIG. 10

METHOD AND SYSTEM FOR DETERMINING RADIO SPECTRUM AVAILABILITY AND QUALITY

CROSS REFERENCES

This application is based upon and claims the benefit of priority from prior Provisional Application No. 61/071,282, filed on Apr. 21, 2008, the entire contents of which are incorporated herein by reference.

TECHNICAL FIELD

This invention relates to the field of radio frequency analysis technologies. More particularly, the present invention relates to methods and systems analyzing radio spectrum availability and quality.

BACKGROUND

Local multi-point distribution services (LMDS) is one way to provide high-bandwidth, interactive services as the wireless platform for extending the current broadband communications infrastructure. LMDS is distinct from other conventional copper cable, optical fiber, and low frequency wireless systems in its use of millimeter wave frequencies for wireless distribution and cellular-like layouts for spectrum reuse and spectral efficiency. The millimeter wave distribution systems often offer broad transmission bandwidths and cost less in time and monetary expenses than implementing wired infrastructures.

However, LMDS systems generally are more susceptible to locations and environment in which the LMDS systems operate. For example, atmospheric and environmentally induced fading of carriers intercepted by subscriber receivers, and in the case of two-way systems by cell-site receivers, may impose additional limitations which can adversely affect transmission performance. In this context, fading can occur due to rain attenuation, beam deflections, and multi-path transmission. Thus, it may be difficult or inconvenient for service providers as well as perspective subscribers to determine service availability and service quality.

Certain techniques have been developed to determine radio frequency coverage availability for a potential subscriber. For example, U.S. Pat. No. 6,445,912 to Cole et al. issued on Sep. 3, 2002, discloses a method for automatically defining communication services available to a potential subscriber on the basis of a street address. This method determines a base station associated with the street address and applies the business rules of that base station of a new subscriber to determine service availability based on an internal base station database. However, such techniques are often used by a singe wireless service provider with pre-established base stations and may be unable to analyze services with desired radio equipment among multiple equipment providers and/or services between two arbitrary service locations. Further, these techniques are often incapable of providing radio frequency solutions with desired radio communication quality or performance.

Methods and systems consistent with certain features of the disclosed systems are directed to solving one or more of the problems set forth above.

SUMMARY

One aspect of the present disclosure may include a method for analyzing radio spectrum solutions of a wireless communication service. The method may include obtaining address information of two end points of a wireless communication path of the wireless communication service and performing a check on the address information based on a database system configured to store valid address information and associated geographical information. The method may also include obtaining location related information including a distance between the two end points and rain zone information based on the address information and associated geographical information, retrieving radio equipment information on a plurality of radio equipment, and determining a plurality of available wireless communication solutions based on the location related information and the radio equipment information. Each solution may include at least one of a radio spectrum availability and a throughput. Further, the method may include presenting the plurality of wireless communication solutions.

Another aspect of the present disclosure may include a system for analyzing radio spectrum solutions of a wireless communication service. The system may include a database and a processor. The database may be configured to store valid address information and associated geographical information. The processor may be configured to obtain address information of two end points of a wireless communication path of the wireless communication service and to perform a check on the address information based on the database. The processor may also be configured to obtain location related information including a distance between the two end points and rain zone information based on the address information and associated geographical information, to retrieve radio equipment information on a plurality of radio equipment, and to determine a plurality of available wireless communication solutions based on the location related information and the radio equipment information. Each solution may include at least one of a radio spectrum availability and a throughput. Further, the processor may be configured to present the plurality of wireless communication solutions.

Another aspect of the present disclosure may include a computer-readable medium for use on a computer system to analyze radio spectrum solutions of a wireless communication service. The computer-readable medium may include computer-executable instructions for performing a method. The method may include obtaining address information of two end points of a wireless communication path of the wireless communication service and performing a check on the address information based on a database system configured to store valid address information and associated geographical information. The method may also include obtaining location related information including a distance between the two end points and rain zone information based on the address information and associated geographical information, retrieving radio equipment information on a plurality of radio equipment, and determining a plurality of available wireless communication solutions based on the location related information and the radio equipment information. Each solution may include at least one of a radio spectrum availability and a throughput. Further, the method may include presenting the plurality of wireless communication solutions.

BRIEF DESCRIPTION OF THE DRAWINGS

FIGS. 8-12 illustrates exemplary presentations provided consistent with the disclosed embodiments.

DETAILED DESCRIPTION

Reference will now be made in detail to the disclosed embodiments of the invention, examples of which are illustrated in the accompanying drawings. Wherever possible, the same reference numbers will be used throughout the drawings to refer to the same or like parts.

Figure 1:
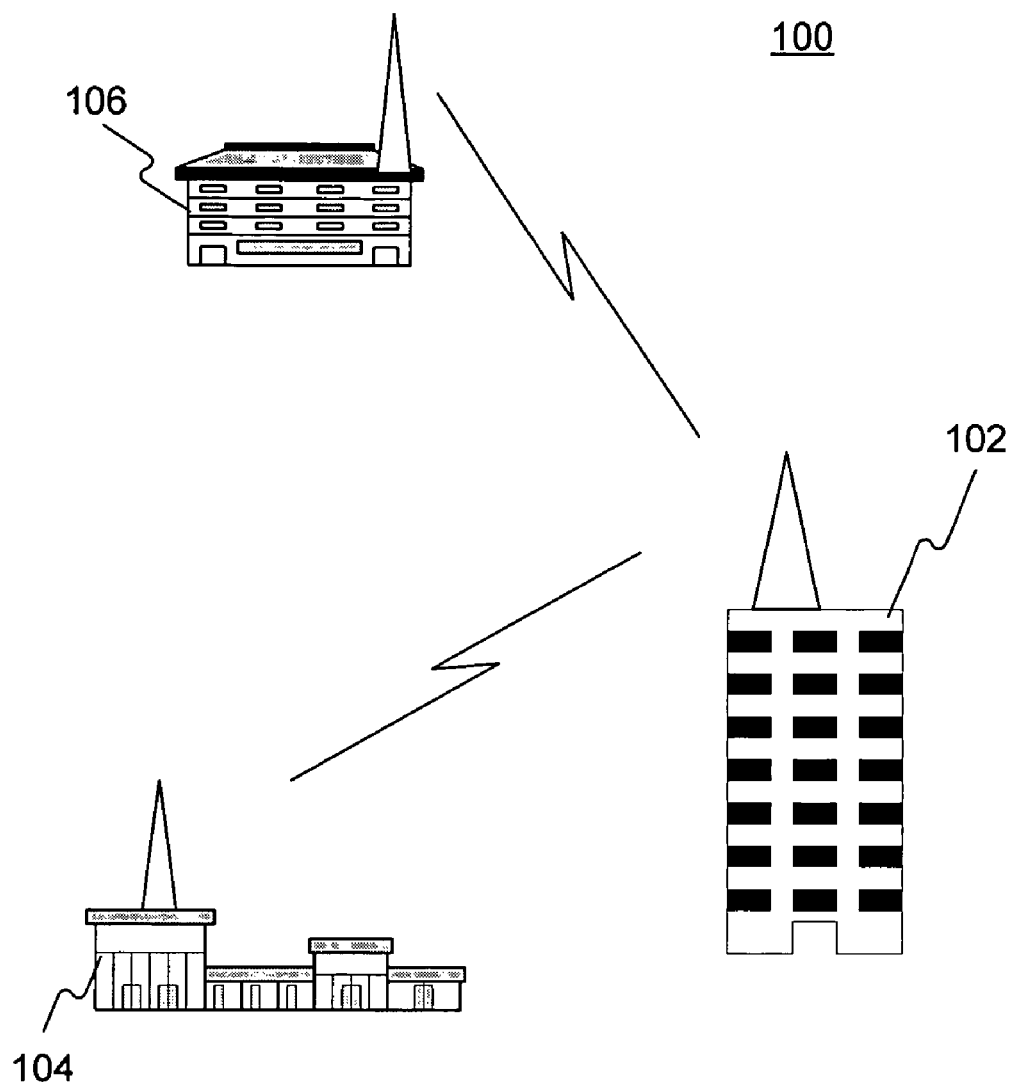
FIG. 1 illustrates an exemplary LMDS environment consistent with the disclosed embodiments.

FIG. 1 illustrates an exemplary local multi-point distribution services (LMDS) environment. As shown in FIG. 1, LMDS environment 100 may include a plurality of LMDS entities. For example, LMDS environment 100 may include a hub 102, a subscriber 104, and a subscriber 106. Although only one hub and two subscribers are included in LMDS environment 100 as shown in FIG. 1, any number of hubs and/or subscribers may be included, and other wireless technologies, such as cellular or fixed wireless, etc., may also be used.

Hub 102 may include any appropriate LMDS equipment configured to provide wireless communications between hub 102 and one or more subscribers simultaneously. For example, hub 102 may include a hub antenna to transmit and receive radio waves to and from subscribers 104 and 106 at a 28 GHz frequency. Other equipment and frequencies may also be used.

Subscribers 104 and 106 may include any appropriate LMDS equipment to communicate with each other or with other communication entities outside LMDS environment 100 through hub 102. For example, subscribers 104 and 106 may include subscriber antennas to transmit and receive radio waves to and from hub 102 to send and receive data.

Figure 2:
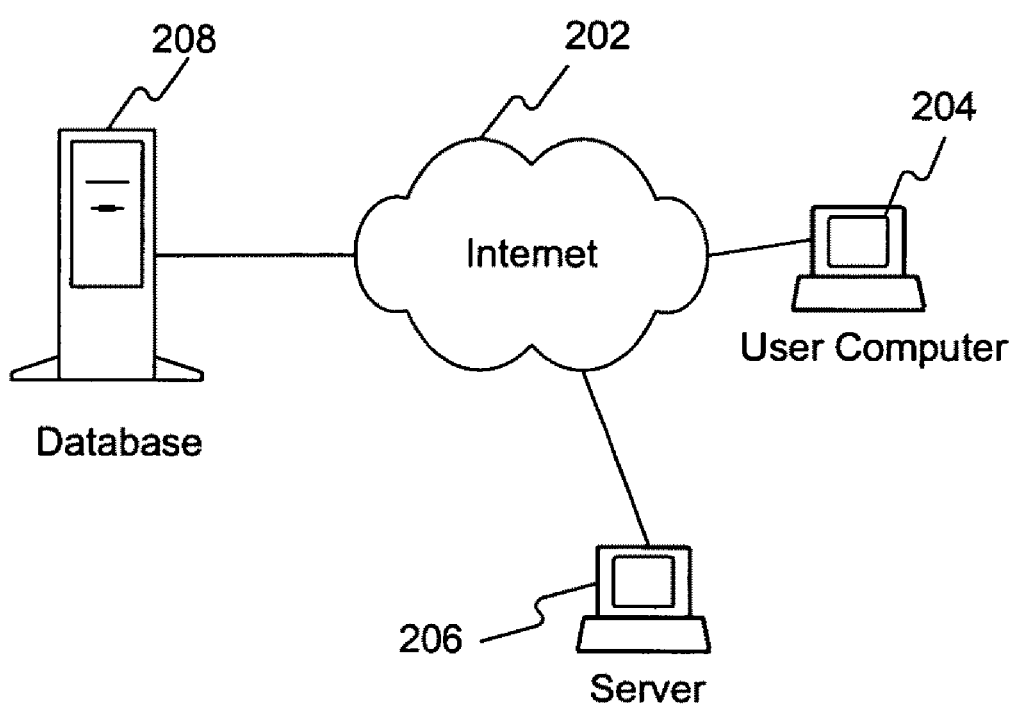
FIG. 2 illustrates an exemplary LMDS solution system for determining availability and quality of LMDS radio spectrum consistent with the disclosed embodiments.

A user of LMDS environment 100 may control any or all of hub 102, subscriber 104, and subscriber 106. However, to determine desired locations for the LMDS entities and to achieve desired communication quality between the entities of LMDS environment 100, it may be desired for the user to interactively adjust configuration parameters of LMDS equipment in LMDS environment 100, such as locations of LMDS entities, radio equipment makes and models, and other characteristics, etc., to determine a desired LMDS solution. FIG. 2 shows an exemplary LMDS solution system to be used by the user to determine a desired LMDS solution.

As shown in FIG. 2, LMDS solution system 200 may include Internet 202, a user computer 204, a server 206, and a database 208. User computer 204, server 206, and database 208 may be connected to Internet 202 such that user computer 204, server 206, and database 208 may communicate between one another.

Internet 202 may include any public accessible network or networks interconnected via transmission control protocol/internet protocol (TCP/IP). Internet 202 often provides communication paths to connect many other networks (not shown), private or public, such that server 206 and/or database 208 may be accessed by user computer 204 from different geological areas without dedicated communication links. Further, through Internet 202, services such as world-wide web (WWW) or electronic mail (e-mail) may be provided to user computer 204. Internet 104 may be The Internet or may be any private or public network. In addition, Internet 202 may be based on Internet Protocol version 4 and/or version 6 or any other combination.

User computer 204 may include any appropriate computer system and software programs configured to provide a user of LMDS solution system 200 with access to server 206. Server 206 may include any appropriate computer system and software programs for communicating with user computer 204 to provide the user with desired LMDS solutions.

Further, database 208 may include any appropriate computer system and database and other software programs, such as database query or search tools, to provide private or public information to user computer 204 and/or server 206. Database 208 may include any appropriate private or public databases. For example, database 208 may include a public database from a government agency, such as U.S. Postal Service or U.S. Census Bureau, etc.

Figure 3:
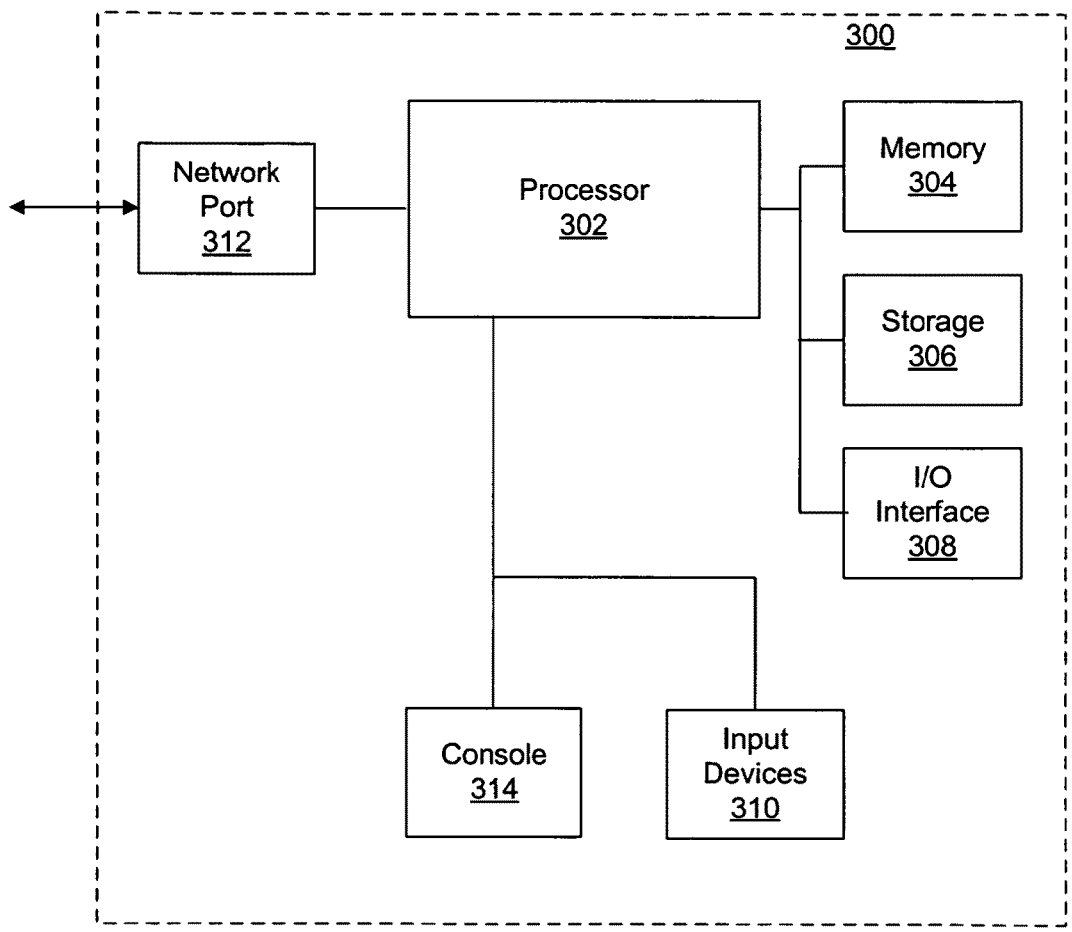
FIG. 3 illustrates an exemplary computer system consistent with the disclosed embodiments.

User computer 204 and/or server 206 may be implemented by any appropriate computer system and software programs. FIG. 3 shows an exemplary computer system used to implement user computer 204 and/or server 206.

As shown in FIG. 3, computer system 300 may include a processor 302, a memory 304, storage 306, an I/O interface 308, input devices 310, a network interface 312, and a console 314. It is understood that the types and number of the listed devices are exemplary only and not limiting. The number of any or all of the listed devices may be changed, certain devices may be removed, and other devices may be added.

Processor 302 may include one or more general purpose microprocessor or special processor such as a network processor or a digital signal processor (DSP). Alternatively, processor 302 may include one or more application-specific integrated circuits (ASICs). Memory 304 may include one or more memory devices including, but not limited to, a ROM, a flash memory, a dynamic RAM, and a static RAM. Memory 302 may be configured to store information used by processor 302 and other devices inside computer system 300.

Storage 306 may include one or more hard disk devices, optical disk devices, floppy disk devices, or other storage devices to provide storage space for computer system 300. Storage 306 may be used to record user information, system information, log messages, databases or other run-time information.

I/O interface 308 may include one or more input/output devices receiving data from processor 302 and sending data to processor 302. Input devices 310 may include a keyboard, a mouse, or other optical or wireless computer input devices. Further, console 314 may include one or more computer screens configured to display information to administrators or users, such as via user graphical interfaces (GUIs).

Network interface 312 may include any appropriate one or more communication modules (i.e., network adaptors) capable of being plugged into computer system 300. Computer system 300 may be connected to Internet 102 via network interface 312. The number of the communication modules is exemplary only and not intended to be limiting, and any number of communication modules may be used.

Returning to FIG. 2, in operation, a user of LMDS solution system 200 may check availability of LMDS radio spectrum via user computer 204, and server 206 may perform an operational process to provide radio spectrum availability and LMDS solutions to the user.

The radio spectrum availability, as used herein, may refer to a percentage of time when the radio link between two LMDS locations is able to provide communication services. For example, a 90% radio spectrum availability means that 90% of the time the radio link between the two LMDS locations is 'up' and able to provide communication services.

The user may enter information at user computer 204 via a web-based interface. For example, user computer 204 may execute software programs developed in web-based programming language, such as Adobe Flash, etc., to allow the user to enter relevant information. The information entered by the user may be forwarded to or retrieved by server 206 for further processing.

Figure 4:
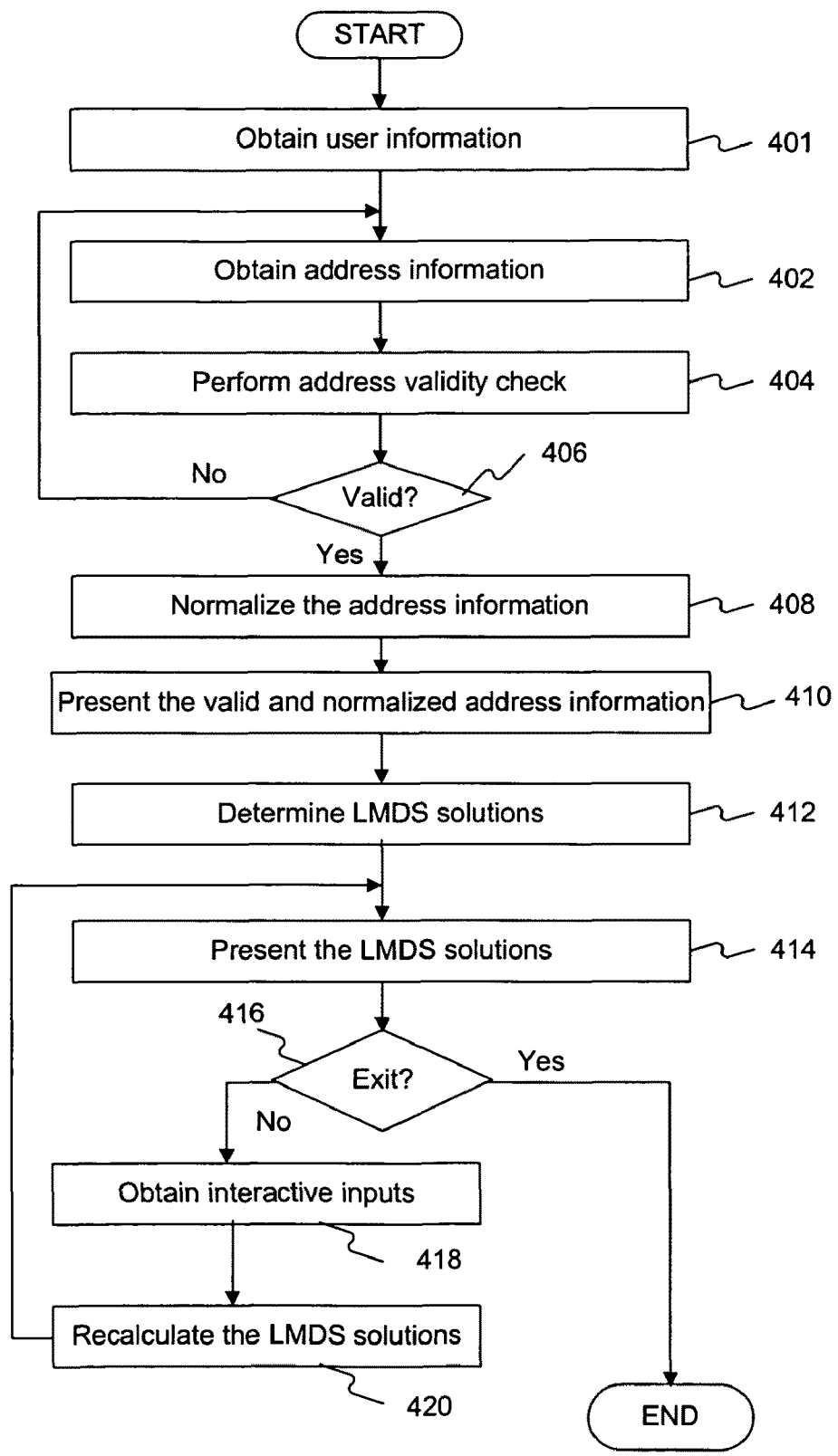
FIG. 4 illustrates an exemplary flow chart of an operational process of an LMDS solution system consistent with the disclosed embodiments.

Server 206 may process the information entered by the user and may send processed information or results back to user computer 204 to be presented to the user. FIG. 4 shows an exemplary operational process performed by server 206 and, more particularly, by processor 302 of computer system 300 implementing server 206.

As shown in FIG. 4, processor 302 may obtain user information (step 401). The user information may include any appropriate information about the user of LMDS solution system 200. For example, the user information may include user's name, the type of the user, such as a carrier, a service provider, a communication company, or an individual. The user information may also include customized information about the user, such as the user's preference on choosing radio or like manufactures. Further, processor 302 may obtain the user information from a login screen (not shown) or from other computer programs.

Figure 5:
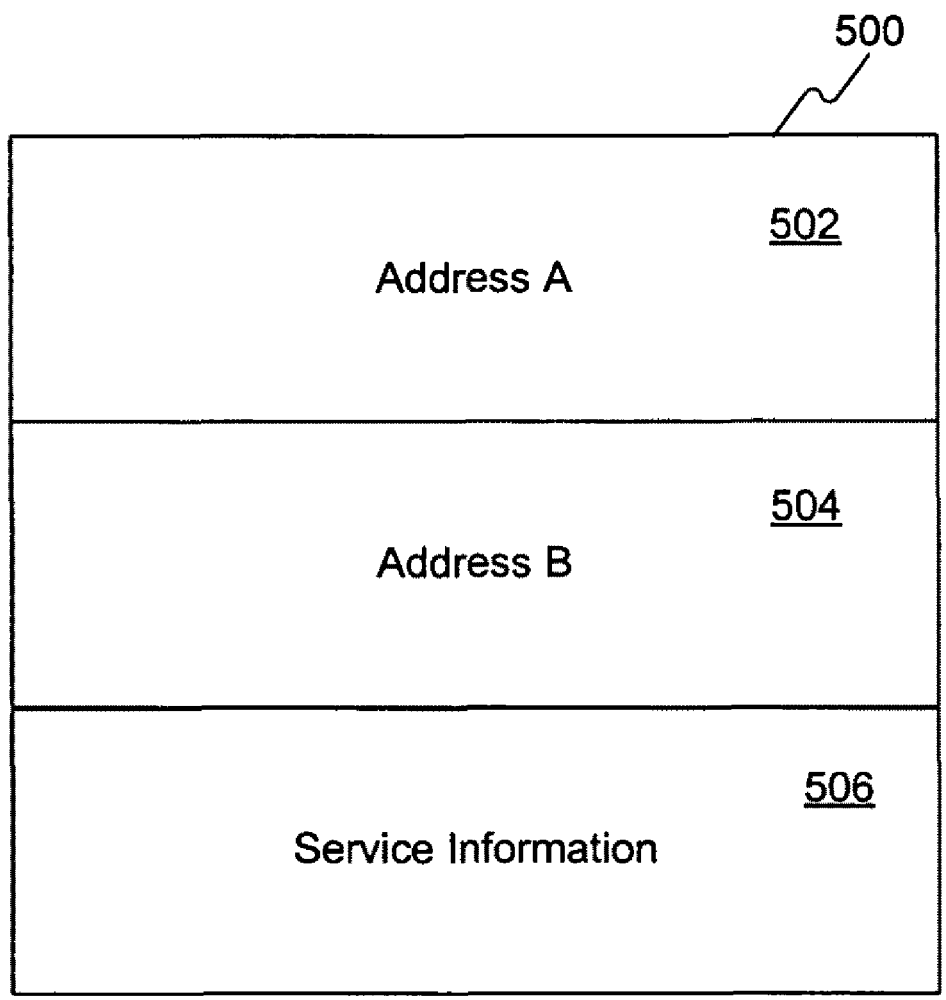
FIG. 5 illustrates a screen configuration of an exemplary LMDS solution system graphical user interface (GUI) consistent with the disclosed embodiments.

Processor 302 may obtain address information about two locations chosen by the user as two end points or locations of a radio communication link such as an LMDS link (step 402). The user may choose the two locations as two subscriber locations or one subscriber location and one hub location (e.g., subscribers 104 and 106, and subscriber 104 or 106 and hub 102, etc.) Processor 302 may obtain information from the user through a web-based interface on user computer 204, which is coupled to server 206 via Internet 202. FIG. 5 shows an exemplary graphical user interface (GUI) from which the user may enter the address information on user computer 204.

As shown in FIG. 5, GUI 500 may include a section 502 for inputting or presenting address information of an address of a first location, address A, and a section 504 for inputting or presenting address information of an address of a second location, address B. GUI 500 may also include a section 506 for displaying or presenting LMDS related information, such as LMDS service information, service coverage information, etc. An exemplary presentation or screenshot of GUI 500 is shown in FIG. 8.

Section 502 and section 504 may allow the user to enter address A and address B in any appropriate format. For example, the user may enter street name and number, city name, state name, and zip code. Other information, however, may also be used as address information. For example, the user may enter a pair of latitude and longitude values for the first location or the second location or both. After entering address information for both the first location and the second location, address A and address B, the user may submit the entered address information to server 206 through user computer 204. Further, as shown in the exemplary screenshot, additional input forms may be used for the user to enter the other information such as latitude and longitude values.

Another exemplary presentation or screenshot of GUI 500 is shown in FIG. 9 (Address information of Address A and Address B is entered for submission). If other information, e.g., latitude and longitude values, is used, processor 302 may translate the other information into address format or may leave the other information intact without translation. As shown in the exemplary screenshot, street address information is entered for address A and latitude and longitude values are entered for address B.

Returning to FIG. 4, after obtaining the address information (step 402), processor 302 may perform a check on the address information entered by the user (step 404). Processor 302 may check the validity or accuracy of the address information obtained regarding address A and/or address B based upon one or more database containing valid or accurate addresses. In certain embodiments, processor 302 may check the address information based on database 208, which may be coupled to server 206 through Internet 202. Other external databases may also be used.

Database 208 may be maintained by the same entity controlling server 206 or may be maintained by an external entity different from the one controlling server 206. For example, database 208 may include the U.S. Census Bureau Topologically Integrated Geographic Encoding and Referencing System or may include a U.S. Postal Service database, etc. Database 208 may also include commercial database systems, such as any geo-database systems or geo-data service portals, etc. Server 206 may implement certain protocols and programming interfaces to interact with database 208 as a third party service.

Processor 302 may use any appropriate algorithm to check whether the address information is valid. For example, processor 302 may look up database 208 to find a match between the address information entered by the user and a valid address stored in database 208, or may search database 208 based on the entered address information using a searching algorithm, such as a syntax searching algorithm which may use approximation instead of exact matching. Further, processor 302 may also perform case-sensitive or case-insensitive searching. Other searching methods, however, may also be used.

After performing the check (step 404), processor 302 may determine whether the address information is valid or accurate in a particular way (step 406). If processor 302 determines that the address information is not valid or accurate (step 406; no), processor 302 may display an error message to the user to indicate the invalid address information, and may continue obtaining new address information in step 402. Optionally, processor 302 may determine whether the address information is recognized but there are errors in spelling. If the address information is recognized, processor 302 may correct the spelling errors in the address information and may display the corrected address information to the user, who may confirm the corrected address information and may submit the corrected address information to processor 302.

On the other hand, if processor 302 determines that the address information is valid or accurate (step 406; yes), processor 302 may normalize or standardize the address information (step 408). That is, processor 302 may, for example, modify the address information such that the modified address information complies with a standard format for representing the address information. For example, processor 302 may normalize the address information according to U.S. Postal Service standards or some other standards. An exemplary presentation or screenshot of GUI 500 is shown in FIG. 10, which illustrates that names of the street, city, and state are properly capitalized, and zip-code extensions are added during the normalization process. If other information, e.g., latitude and longitude values, is used in the address information, processor 302 may normalize the other information or may keep the other information as entered by the user. As shown in the exemplary screen shot, street address information of Address A is normalized, as well as the latitude and longitude values of Address B.

Processor 302 may also obtain certain information associated with the valid address information from database 208 during a database search when performing validity check. For example, processor 302 may obtain geographical location information, such as a latitude number and a longitude number for each of the valid street address, and may derive a distance between two valid addresses.

Processor 302 may also obtain boundary information, such as in which county the valid address is located, and weather related information, such as a rain zone in which the address is located, based on the county location and county information. Processor 302 may obtain such information from database 208 or may obtain such information from other relevant databases based on the valid address information from database 208. The rain zone information, as used herein, may refer to information on rainfall related data for a particular area, such as a county, a region within a county, or a certain predefined geographical area, etc.

The rain zone information may be important for deploying millimeter microwave systems, such as LMDS systems, and may be represented by a rain zone class reflecting the amount, the frequency, or the likelihood of rain of a particular area, such as an area covering both address A and address B. Other information, however, may also be obtained, for example, information on any other type of natural or man-made condition that may be relevant to deployment of wireless communication systems. The rain zone information for a particular address or location may be represented by a single letter according to certain standard body, such as International Telecommunication Union (ITU). For example, the rain zone may be represented by a letter from A-Q.

Further, processor 302 may present the valid and normalized address information to the user (step 410). Processor 302 may send the valid and normalized address information to user computer 204 to be displayed via GUI 500. For example, as shown in the exemplary screen shot, valid and normalized address A may be presented to the user in section 502 and valid and normalized address B may be presented to the user in section 504. Processor 302 may also display service information about whether service is provided between address A and address B in section 506 of GUI 500. Processor 302 may also request the user to confirm the normalized address and to submit the normalized address to obtain available LMDS solutions with respect to address A and address B.

Processor 302 may determine the available LMDS solutions based on the address information and other LMDS information (step 412). An LMDS solution, as used herein, may refer to a configuration of radio equipment and other system and environment parameters to provide an LMDS service between two end locations (e.g., address A and address B). The LMDS solution may be defined by a plurality of LMDS characteristics, such as radio link characteristics, equipment characteristics, and deployment characteristics, etc. For example, an LMDS solution may include information about frequency of the spectrum used (e.g., 28 GHz), bandwidth or throughput of the radio link, rain conditions of the locations using the LMDS equipment, distances between LMDS locations, rain fade (e.g., the absorption of a microwave radio frequency signal by atmospheric rain, snow or ice, etc.), radio manufacturer, antenna size, antenna polarization, field margin, radio transmission power, and receiver sensitivity, modulation scheme, etc. Other information may also be used.

Server 206 may include an LMDS equipment database containing information about LMDS equipment that may be used in the LMDS solutions. For example, the LMDS equipment database may include information about radio equipment manufacturers, radio equipment model, antenna information, and radio spectrum specification, such as frequency, bandwidth or throughput, modulation, etc. Other information may also be included.

Processor 302 may calculate a plurality of LMDS solutions available between address A and address B. For example, processor 302 may calculate LMDS solutions using radio equipment from different equipment manufacturer or vendors based on the LMDS database. Processor 302 may also calculate LMDS solutions using different radio spectrum characteristics and deployment characteristics. Further, processor 302 may calculate LMDS solutions using equipment from the same equipment vendor, but with different throughput or modulation schemes.

Processor 302 may also update the LMDS equipment database periodically to include newly available equipment vendors or radio equipment. Processor 302 may dynamically update the LMDS equipment database upon a request from the user or from other entity to include newly available radio equipment or equipment vendors for up-to-date information.

Further, processor 302 may calculate the plurality of LMDS solutions based on any appropriate algorithm or tool for calculating LMDS solutions. For example, processor 302 may use a preliminary circuit design and/or radio frequency analysis tool to calculate LMDS solutions. Input parameters to the calculation algorithm may include a plurality of LMDS link characteristic variables, such as antenna size, antenna polarization, field margin, radio frequency, distance between address A and address B, rain zone, radio equipment manufacturer or vendor, transmission power, receiver sensitivity, and modulation scheme, etc. Other variables may also be used.

Figure 6:
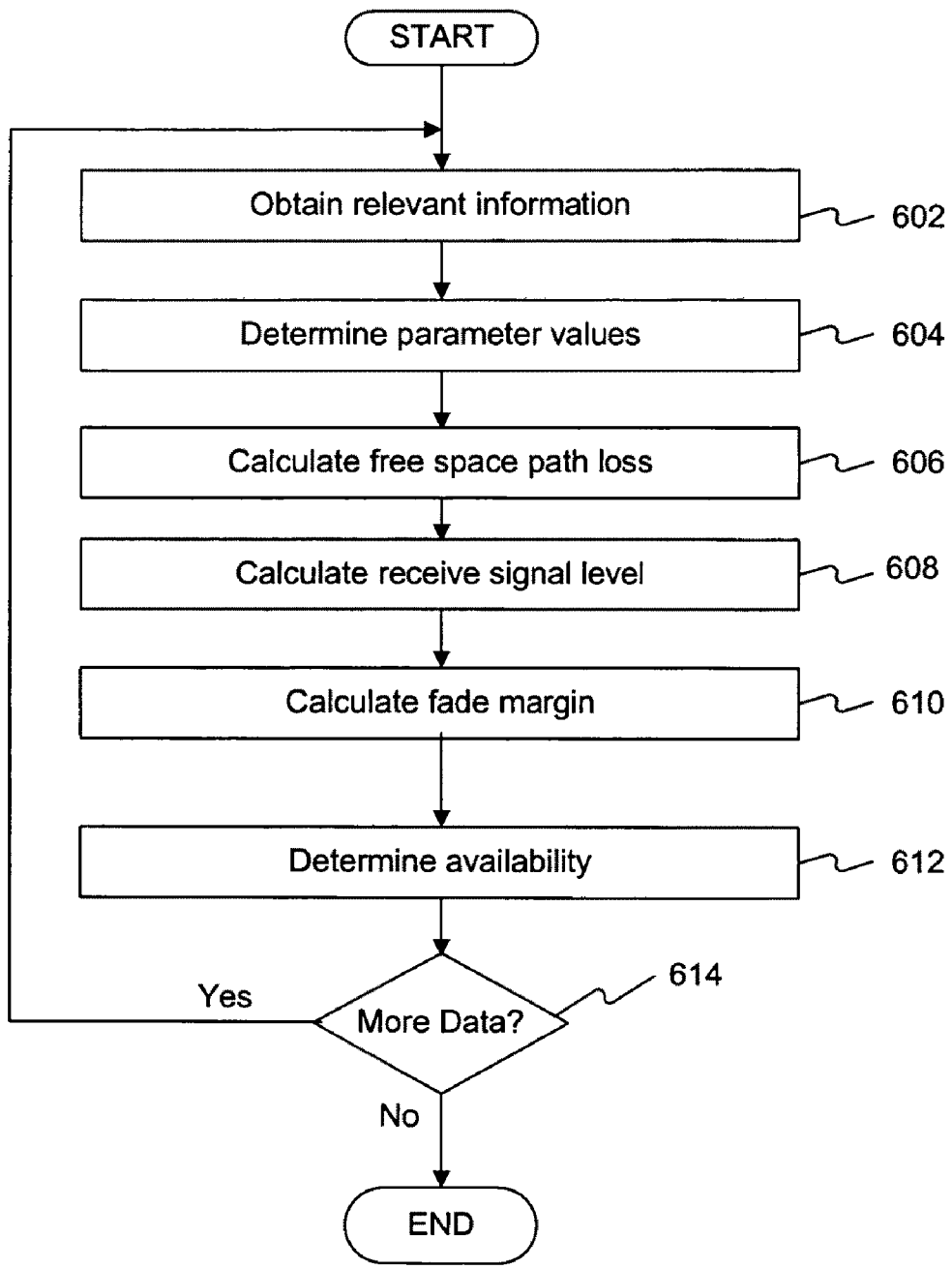
FIG. 6 illustrates an exemplary flow chart of an operational process for determining LMDS radio spectrum availability consistent with the disclosed embodiments.

On the other hand, output parameters from the algorithm may include a plurality of performance variables, such as LMDS radio spectrum availability and link throughput. The link throughput, as used herein, may refer to a bit rate of the communication link between address A and address B. For example, the link throughput may be 100 mb (mega bits per second) and may be pre-determined based on a particular radio equipment model and/or vendor. FIG. 6 shows an exemplary process for determining LMDS radio spectrum availability.

As shown in FIG. 6, processor 302 may obtain information relevant to LMDS radio spectrum availability (step 602). For example, processor 302 may obtain the information corresponding to the input parameters including a plurality of LMDS link characteristic variables, such as antenna characteristics, field margin, radio frequency, distance between address A and address B, rain zone, radio equipment manufacturer or vendor, transmission power, receiver sensitivity, and modulation scheme, etc.

Processor 302 may also determine certain parameter values or constants based on the obtained information (step 604). For example, processor 302 may determine antenna gain, transmission power, and receiver sensitivity based on antenna characteristics from radio equipment manufacturers, such as from specification of radio equipment.

Processor 302 may also determine a frequency of the LMDS radio spectrum (e.g., 28 GHz) and frequency-dependent coefficients for an attenuation model corresponding to linear polarization of the antenna. For example, processor 302 may determine a specific attenuation model, such as ITU-R P. 838-1, and may determine these coefficients (e.g., Alpha factor, P factor) of 28 GHz for vertical polarization and/or horizontal polarization of the antenna. Other polarization and/or attenuation models may also be used.

Processor 302 may also determine rain rates based on the rain zone information. As used herein, a rain rate may be represented by the amount of rain fall (millimeter) per hour (mm/h). Processor 302 may determine rain rates of respective rain zones based on a knowledge database or based on a lookup table.

Further, processor 302 may calculate free space path loss (FSPL) based on the parameters values (step 606). For example, processor 302 may calculate FSPL as: a*Log (Distance*Frequency)+b, where 'a' and 'b' are constants, 'Distance' is the distance between address A and address B, and 'Frequency' is the LMDS radio spectrum frequency. Other formula may also be used.

Processor 302 may also calculate receiver signal level (RSL) (step 608). Processor 302 may calculate receiver signal level based on previously calculated FSPL and other parameters. For example, processor 302 may calculate the receiver signal level as: Antenna Gain of address A−Transmit Power of address A−FSPL−Field Margin Loss+Antenna Gain of address B−c*(Link Margin), where 'c' is a constant. Other formula may also be used.

Processor 302 may also calculate fade margin (step 610). Processor 302 may calculate fade margin based on previously calculated RSL and parameters. For example, processor 302 may calculate fade margin as: RSL—receiver sensitivity. Other formula may also be used.

Further, processor 302 may determine availability of the LMDS radio spectrum (step 612) based on the previously calculated fade margin and parameters. For example, processor 302 may use an attenuation model and calculate the LMDS radio spectrum availability based on the fade margin, the distance, the rain rate, and the frequency-dependent coefficients, etc. For example, processor 302 may calculate the radio spectrum availability as: Availability=IF(Fade Margin<=0, 0, IF(0.172*LOG(Fade Margin/(Distance*((Rain Rate^Alpha)*P Factor)*1/(1+Distance/(35*EXP(−0.015*Rain Rate)))*0.12))>0.298,"99.9999",100−10^((0.546−SQRT(0.298−0.172*LOG(Fade Margin/(Distance*((Rain Rate^Alhpa)*P Factor)*1/(1+Distance/(35*EXP(−0.015*Rain Rate)))*0.12))))/(−0.086)))), where 'IF', 'LOG', 'SQRT', and 'EXP' are computer programming language operators or functions. Other methods may also be used.

Processor 302 may determine whether there is more data available to calculate other availabilities or to update the current availability (step 614). If processor 302 determines that no more data need to be processed (step 614; no), processor 302 may complete the availability determination process. On the other hand, if processor 302 determines that more data need to be processed (step 614; yes), processor 302 may continue the availability determination process from step 602.

Returning to FIG. 4, after determining the LMDS solutions (step 412), processor 302 may optionally rank the available LMDS solutions according to the performance variables. For example, processor 302 may rank the LMDS solutions based on radio spectrum availability, from the highest to the lowest, or may rank the LMDS solutions based on throughput, from the highest to the lowest. Processor 302 may also rank the LMDS solutions based on a combination of the radio spectrum availability and the throughput. Other ranking methods, however, may also be used.

Figure 7:
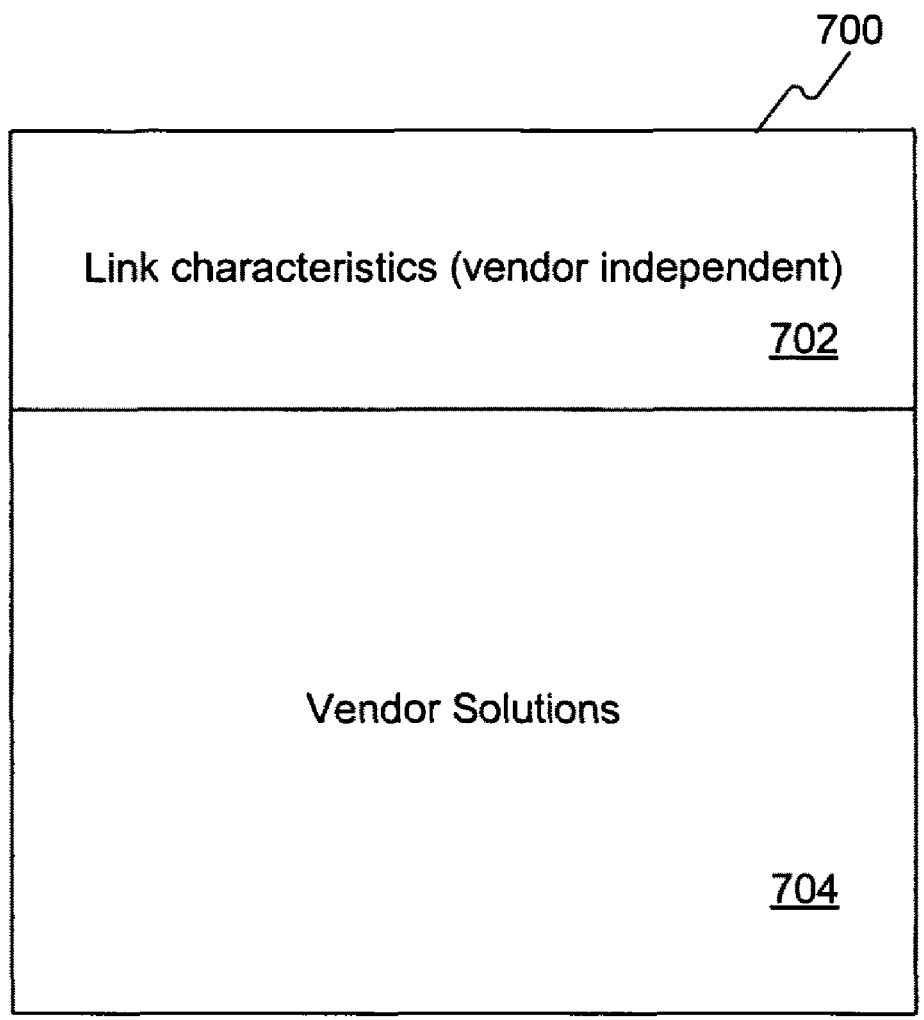
FIG. 7 illustrates another screen configuration of an exemplary LMDS solution system graphical user interface (GUI) consistent with the disclosed embodiments.

After determining the available solutions (step 412), processor 302 may present the available LMDS solutions to the user (step 414). Processor 302 may present the LMDS solutions in any appropriate format. For example, processor 302 may choose desired LMDS solutions (e.g., one or more LMDS solutions with desired radio spectrum availability and/or throughput), and may present the desired LMDS solutions to the user via a user interface via user computer 204. FIG. 7 shows an exemplary GUI 700 for presenting the LMDS solutions.

As shown in FIG. 7, GUI 700 may include a section 702 and a section 704. Section 702 may be configured to present LMDS link characteristic variables, such as, antenna size, antenna polarization, field margin, radio frequency, distance between address A and address B, and rain zone, etc. These link characteristic variables may be vendor independent. That is, these variables may be common to radio equipment manufacturers or vendors. Further, the user may change the values of the link characteristic variables to view a particular LMDS solution or solutions corresponding to the changed link characteristics.

Section 704 may be configured to present a particular LMDS solution or solutions from a particular radio equipment vendor among a plurality of radio equipment vendors. For example, section 704 may include available radio equipment vendors and, for each vendor, available radio equipment and associated performance characteristics, such as radio spectrum availability and/or LMDS throughput, etc. Other information may also be displayed.

Processor 302 may determine the plurality of radio equipment vendors based on the user information obtained in Step 401. For example, processor 302 may determine the radio equipment vendors based on user preferences of such vendors in the user information. Further, the user may choose a particular radio equipment vendor or a plurality of radio equipment vendors.

Figure 11:
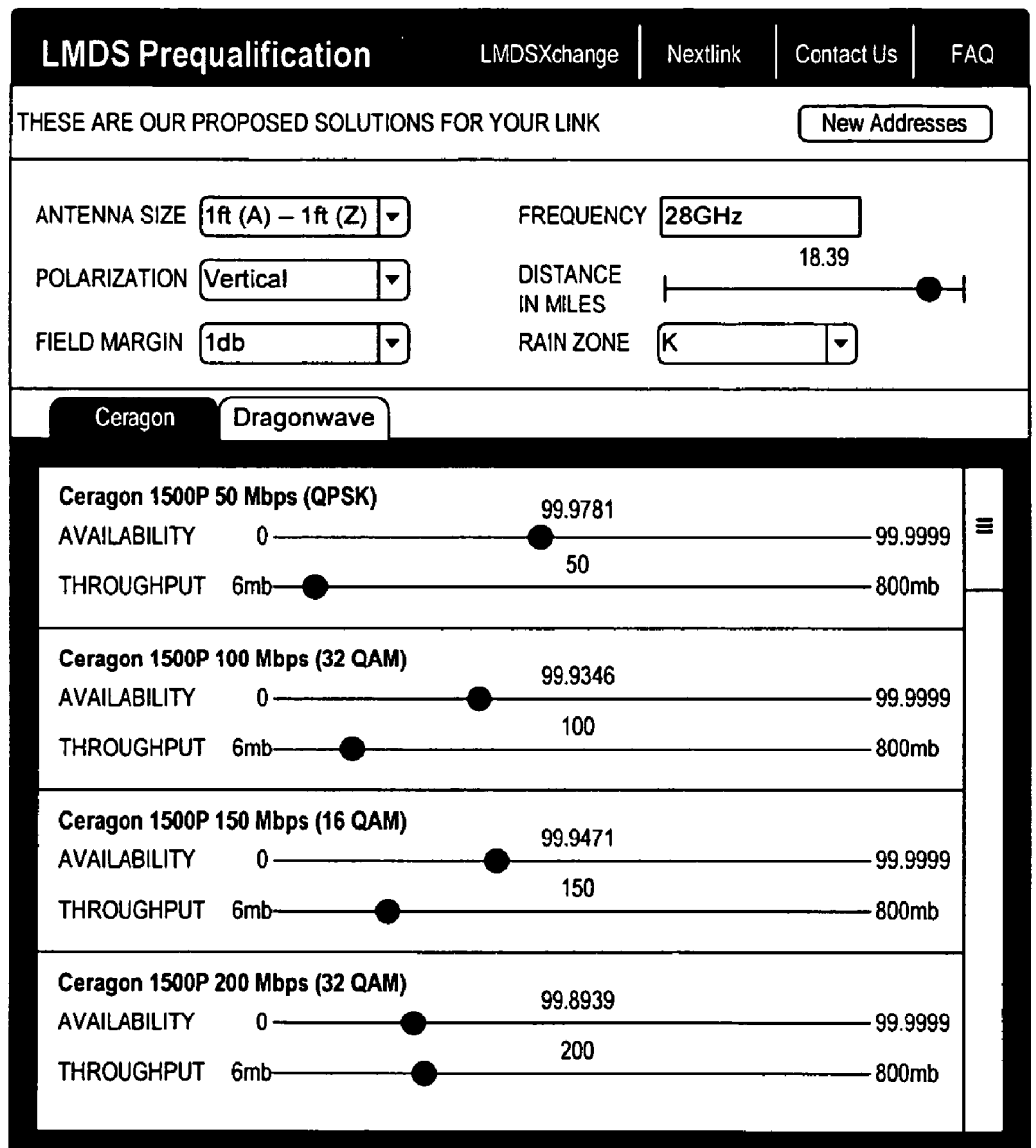

An exemplary presentation or screenshot 1100 of GUI 700 is shown in FIG. 11, which illustrates link characteristic variables given particular values, e.g., antenna size of 1-foot diameter for address A and 1-foot for address B, vertical antenna polarization, field margin of 1 dB, frequency of 28 GHz, distance of 18.39 miles, and rain zone of K class, etc. All link characteristic variables may be modified and the distance may be changed via a sliding mechanism for desired operations by the user. Further, radio equipment vendor Ceragon is chosen to provide a total of four LMDS solutions: LMDS solution one is provided by Ceragon 1500P 50 Mbps (QPSK) with a radio spectrum availability of 99.9781%; LMDS solution two is provided by Ceragon 1500P 100 Mbps (32 QAM) with a radio spectrum availability of 99.9346%; LMDS solution three is provided by Ceragon 1500P 150 Mbps (16 QAM) with a radio spectrum availability of 99.9471%; and LMDS solution four is provided by Ceragon 1500P 200 Mbps (32 QAM) with a radio spectrum availability of 99.8939%. Further, the user may be able to choose a LMDS solution by selecting one LMDS solution from displayed LMDS solutions.

Figure 12:
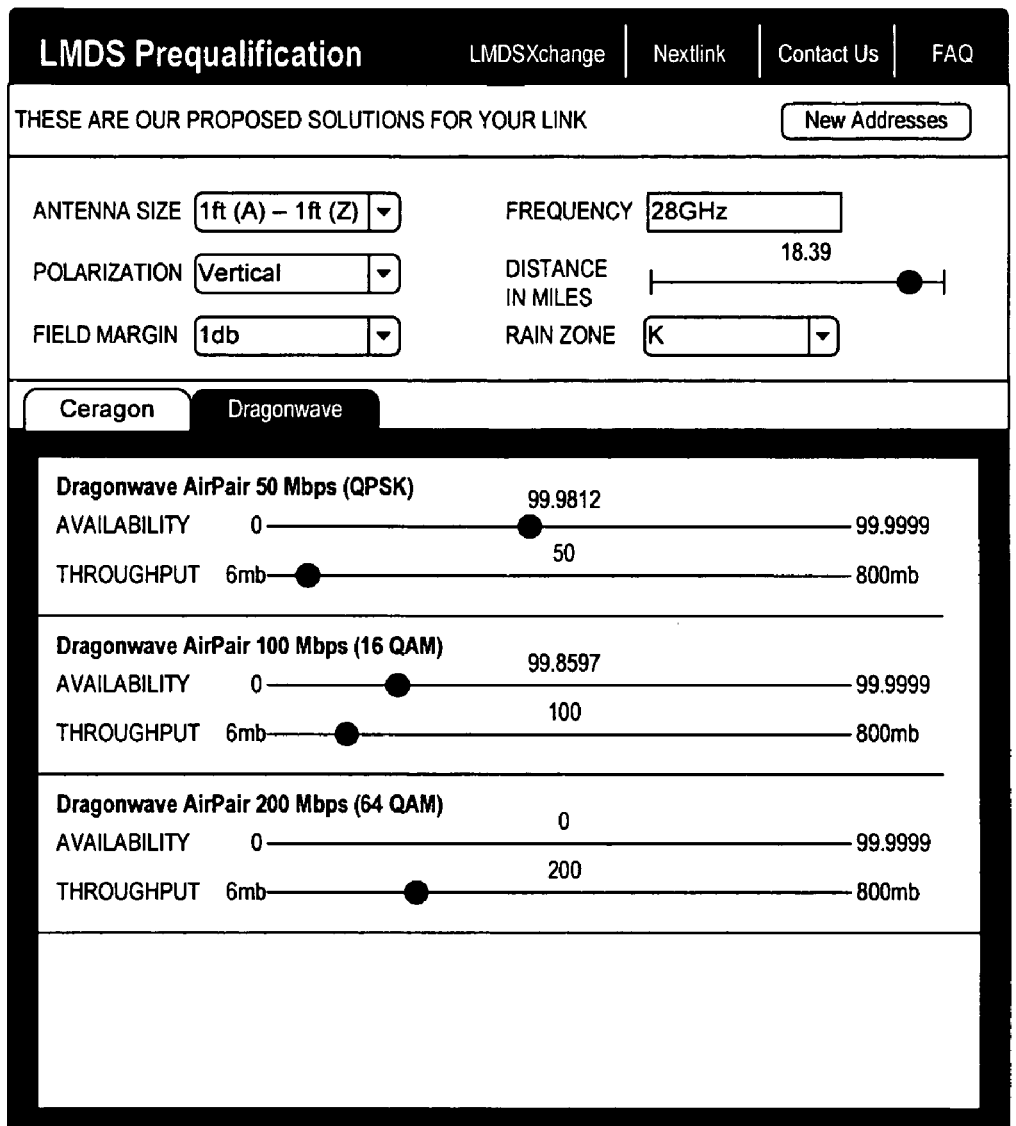

A second radio equipment vendor, Dragonwave, is also displayed in presentation 1100. The user may select Dragonwave to choose available LMDS solutions from Dragonwave. Another exemplary presentation or screenshot 1200 of GUI 700 is shown in FIG. 12, which illustrates three LMDS solutions provided by Dragonwave: LMDS solution one is provided by Dragonwave AirPair 50 Mbps (QPSK) with a radio spectrum availability of 99.9812%; LMDS solution two is provided by Dragonwave AirPair 100 Mbps (16 QAM) with a radio spectrum availability of 99.8597%; and LMDS solution three is provided by Dragonwave AirPair 200 Mbps (64 QAM) with a radio spectrum availability of 0%, that is, not available at all. Although only two radio equipment vendors are included for exemplary purposes, any number of radio equipment vendors may be included. Further, a new radio equipment vendor or vendors may be included dynamically in operation.

Returning to FIG. 4, processor 302 may present the available LMDS solutions to the user via GUI 700 via user computer 204 (step 414). Processor 302 may choose a desired LMDS solution or solutions by ranking the available LMDS solutions and may present the desired LMDS solution or solutions to the user. For example, processor 302 may present a desired antenna size, antenna polarization, field margin, radio frequency, distance between address A and address B, and rain zone, etc., in section 702 of GUI 700. Processor 302 may also present a desired radio vendor of the desired LMDS solution or solutions and associated equipment characteristics, such as make and model of the radio equipment, and modulation scheme, etc., and performance characteristics, such as radio spectrum availability and throughput, etc., in section 704 of GUI 700.

Further, processor 302 may provide purchase options for a particular LMDS solution or solutions determined by processor 302 or chosen by the user. The purchase options may include any appropriate choices on pricing or service associated with purchasing the particular LMDS solution or solutions. For example, the purchase options may include an option for purchasing the radio spectrum only, an option for purchasing the radio spectrum and the radio equipment, and an option for purchasing the radio spectrum, the radio equipment, and managed services, such as installation, repair, or maintenance or any combination thereof.

Processor 302 may provide the purchase options based on predetermined criteria or the user information. The user may further choose a particular purchase option to purchase the particular LMDS solution or solutions online.

After presenting the LMDS solutions (step 414), processor 302 may determine whether to exit the operational process (step 416). If processor 302 determines to exit the operational process (step 416; yes), processor 302 may complete the operational process. For example, the user may indicate that he/she has finished the software program on user computer 204, or user computer 204 may indicate a timeout has happened with respect to the software program. The user may also have chosen a particular purchase option and purchased the particular LMDS solution or solutions with the particular purchase option online.

On the other hand, if processor 302 determines not to exit the operational process (step 416; no), processor 302 may continue the operational process to obtain interactive input from the user (step 418). For example, the user may selectively change any or all of the LMDS link characteristics displayed or presented in section 702 of GUI 700. In certain embodiments, the user may choose an antenna size from available options, such as 1-foot diameter antenna for address A and 1-foot antenna for address B; 1-foot antenna for address A and 2-foot antenna for address B; 2-foot antenna for address A and 2-foot antenna for address B; and 2-foot antenna for address A and 1-foot antenna for address B, etc. Other antenna sizes may also be used.

The user may choose an antenna polarization from available options, such as vertical polarization and horizontal polarization, etc. The user may also choose a different field margin for antenna deployment, and an available radio frequency (e.g., 26 GHz, 28 GHz, 29 GHz, and 31 GHz, etc.). In certain embodiments, a single available radio frequency (e.g., 28 GHz) may be chosen as the available radio frequency, and other available radio frequencies may be included later for selection. Further, the user may change the distance between address A and address B, and may choose a rain zone from available options, such as rain zones B, D, E, K, and M, etc. Other information including atmospheric information, may also be changed or used. Processor 302 may be notified after the user finishes changing or inputting the LMDS link characteristics and may recognize or be provided with the change or input via user computer 204.

After obtaining the interactive input (step 418), processor 302 may recalculate the available LMDS solutions based on the values inputted from the user (step 420). For example, processor 302 may recalculate the available LMDS solutions according to step 412. Other calculation algorithms, however, may also be used in the recalculation of the available LMDS solutions. After recalculating the available LMDS solutions (step 420), processor 302 may continue the operational process by presenting or re-presenting the LMDS solutions to the user from step 414. The user may choose a desired LMDS solution from the available LMDS solutions.

By using the disclosed methods and systems, an LMDS service provider may automatically provide a series of LMDS information to the user or potential user with minimum user input, the user may not need to have any radio specific information at hand. The disclosed methods and systems may store actual radio information by radio manufacturers and by models, and may calculate available LMDS solutions using the actual radio information from specific radio makes and models. Further, the disclosed methods and systems may provide interactive user interfaces to allow the user to try different parameters and to choose a desired LMDS solution, and an external database may be used to reduce the cost on updating internal databases and to improve accuracy. The disclosed methods and systems may also be integrated with other online e-commerce systems to provide customized online purchase of the desired LMDS solution with a customized purchase option chosen by the user or chosen based on the user information.

Other embodiments of the invention will be apparent to those skilled in the art from consideration of the specification and practice of the invention disclosed herein. It is intended that the specification and examples be considered as exemplary only.

What is claimed is:

1. A method for analyzing radio spectrum solutions of a wireless communication service, comprising:
   obtaining address information of two end points of a wireless communication path of the wireless communication service;
   performing a check on the address information based on a database system configured to store valid address information and associated geographical information;
   obtaining location related information including a distance between the two end points and rain zone information based on the address information and associated geographical information;
   retrieving radio equipment information on a plurality of radio equipment;
   determining a plurality of available wireless communication solutions based on the location related information and the radio equipment information, wherein each solution includes at least one of a radio spectrum availability and a throughput; and
   presenting the plurality of wireless communication solutions.

2. The method according to claim 1, further including:
normalizing the valid address information; and
presenting the normalized address information.

3. The method according to claim 1, wherein obtaining location related information further includes:
retrieving the associated geographical information based on the address information;
determining the distance based on the geographical information; and
identifying the rain zone information based on the geographical information.

4. The method according to claim 1, wherein the radio spectrum availability is determined by:
determining a free space path loss between the two end points based on the distance and a frequency of the radio spectrum;
determining a receiver signal level based on the radio equipment information and the free space path loss;
determining a fade margin based on the receiver signal level and the radio equipment information; and
determining the radio spectrum availability based on the fade margin.

5. The method according to claim 4, wherein determining the radio spectrum availability further includes:
determining one or more rain rates corresponding to the rain zone information;
determining one or more frequency-dependent coefficients of an attenuation model; and
determining the radio spectrum availability based on the fade margin, the rain rates, the distance, and the frequency-dependent coefficients.

6. The method according to claim 1, further including:
dynamically updating radio equipment information on the plurality of radio equipment; and
periodically including newly available radio equipment information.

7. The method according to claim 1, further including:
recognizing a change of the radio equipment information or the location related information; and
determining another plurality of available wireless communication solutions according to the change; and
presenting the another plurality of available wireless communication solutions.

8. The method according to claim 1, wherein the presenting further includes:
ranking the plurality of available wireless communication solutions according to at least one of the radio spectrum availability and the throughput; and
displaying the plurality of available wireless communication solutions based on the ranking.

9. The method according to claim 8, further including:
selecting a particular wireless communication solution from the plurality of available wireless communication solutions; and
displaying a plurality of purchase options for the particular wireless communication solution.

10. The method according to claim 1, wherein:
the plurality of available wireless communication solutions are determined for a plurality of radio equipment manufacturers; and
the plurality of available wireless communication solutions are presented for one of the plurality of radio equipment manufacturers at one time.

11. A system for analyzing radio spectrum solutions of a wireless communication service, comprising:
a database configured to store valid address information and associated geographical information; and
a processor configured to:
obtain address information of two end points of a wireless communication path of the wireless communication service;
perform a check on the address information based on the database;
obtain location related information including a distance between the two end points and rain zone information based on the address information and associated geographical information;
retrieve radio equipment information on a plurality of radio equipment;
determine a plurality of available wireless communication solutions based on the location related information and the radio equipment information, wherein each solution includes at least one of a radio spectrum availability and a throughput; and
present the plurality of wireless communication solutions.

12. The system according to claim 11, the processor is further configured to:
normalize the valid address information; and
present the normalized address information.

13. The system according to claim 11, wherein, to obtain location related information, the processor is further configured to:
retrieve the associated geographical information based on the address information;
determine the distance based on the geographical information; and
identify the rain zone information based on the geographical information.

14. The system according to claim 11, wherein to determine the radio spectrum availability, the processor is further configured to:
determine a free space path loss between the two end points based on the distance and a frequency of the radio spectrum;
determine a receiver signal level based on the radio equipment information and the free space path loss;
determine a fade margin based on the receiver signal level and the radio equipment information; and
determine the radio spectrum availability based on the fade margin.

15. The system according to claim 14, wherein to determine the radio spectrum availability, the processor is further configured to:
identify one or more rain rates corresponding to the rain zone information;
determine one or more frequency-dependent coefficients of an attenuation model; and
determine the radio spectrum availability based on the fade margin, the rain rates, the distance, and the frequency-dependent coefficients.

16. The system according to claim 11, the processor is further configured to:
dynamically update radio equipment information on the plurality of radio equipment; and
periodically include newly available radio equipment information.

17. The system according to claim 11, the processor is further configured to:
recognize a change of the radio equipment information or the location related information; and
determine another plurality of available wireless communication solutions according to the change; and present the another plurality of available wireless communication solutions.

18. The system according to claim 11, wherein, to present, the processor is further configured to:
rank the plurality of available wireless communication solutions according to at least one of the radio spectrum availability and the throughput; and
display the plurality of available wireless communication solutions based on the ranking and for one of a plurality of radio equipment manufacturers at one time,
wherein the plurality of available wireless communication solutions are determined for a plurality of radio equipment manufacturers.

19. A computer-readable medium for use on a computer system configured to analyze radio spectrum solutions of a wireless communication service, the computer-readable medium having computer-executable instructions for performing a method comprising:
obtaining address information of two end points of a wireless communication path of the wireless communication service;
performing a check on the address information based on a database system configured to store valid address information and associated geographical information;
obtaining location related information including a distance between the two end points and rain zone information based on the address information and associated geographical information;
retrieving radio equipment information on a plurality of radio equipment;
determining a plurality of available wireless communication solutions based on the location related information and the radio equipment information, wherein each solution includes at least one of a radio spectrum availability and a throughput; and
presenting the plurality of wireless communication solutions.

20. The computer-readable medium according to claim 19, wherein the radio spectrum availability is determined by:
identifying one or more rain rates corresponding to the rain zone information;
determining one or more frequency-dependent coefficients of an attenuation model;
determining a free space path loss between the two end points based on the distance and a frequency of the radio spectrum;
determining a receiver signal level based on the radio equipment information and the free space path loss;
determining a fade margin based on the receiver signal level and the radio equipment information; and
determining the radio spectrum availability based on the fade margin, the rain rates, the distance, and the frequency-dependent coefficients.

21. The computer-readable medium according to claim 19, the method further including:
recognizing a change of the radio equipment information or the location related information; and
determining another plurality of available wireless communication solutions according to the change; and
presenting the another plurality of available wireless communication solutions in an order based on at least one of the radio spectrum availability and the throughput.

* * * * *